US012690014B2

(12) United States Patent
Liu

(10) Patent No.: US 12,690,014 B2
(45) Date of Patent: Jul. 21, 2026

(54) METHOD AND APPARATUSES, USER EQUIPMENT, BASE STATION, AND STORAGE MEDIUM FOR RECEIVING AND SENDING SIGNAL

(71) Applicant: Beijing Xiaomi Mobile Software Co., Ltd., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 327 days.

(21) Appl. No.: 18/558,950

(22) PCT Filed: May 8, 2021

(86) PCT No.: PCT/CN2021/092509

§ 371 (c)(1),
(2) Date: Nov. 3, 2023

(87) PCT Pub. No.: WO2022/236507

PCT Pub. Date: Nov. 17, 2022

(65) Prior Publication Data

US 2024/0224230 A1 Jul. 4, 2024

(51) Int. Cl.
*H04W 68/02* (2009.01)
*H04L 5/00* (2006.01)
(Continued)

(52) U.S. Cl.
CPC ........... *H04W 68/02* (2013.01); *H04L 5/0051* (2013.01); *H04W 56/0015* (2013.01); *H04W 72/231* (2023.01)

(58) Field of Classification Search
CPC .............. H04L 5/0051; H04L 5/0048; H04W 56/0015; H04W 68/02; H04W 72/231;
(Continued)

(56) References Cited

U.S. PATENT DOCUMENTS 12,477,515 B2 * 11/2025 Liao ...................... H04W 24/08
2019/0363831 A1 11/2019 Davydov et al.
(Continued)

FOREIGN PATENT DOCUMENTS

CN 112673685 A 4/2021
WO 2020227139 A1 11/2020

OTHER PUBLICATIONS

OPPO. "Further discussion on RS occasion for idle/inactive UEs"3GPP TSG RAN WG1#104-e R1-2100169, Jan. 18, 2021 (Jan. 18, 2021). full text. section 2.
(Continued)

*Primary Examiner* — Nguyen T Vo
(74) *Attorney, Agent, or Firm* — Volpe Koenig

(57) ABSTRACT

A method, apparatus and non-transitory computer readable storage medium that improve power consumption and efficiency of a wireless system. The power consumption and efficiency of the wireless system is improved by: a UE may receive an indication message sent by a base station, the indication message comprising a PEI, and the PEI being used for indicating the availability state of a reference signal of the UE; and according to the availability state of the reference signal, the UE uses the reference signal to perform synchronization.

16 Claims, 7 Drawing Sheets

(51) Int. Cl.
   *H04W 56/00*          (2009.01)
   *H04W 72/231*        (2023.01)
(58) Field of Classification Search
   CPC ........... H04W 52/0261; H04W 56/001; H04W
                       68/00; H04W 76/27; Y02D 30/70
   See application file for complete search history.

(56)                    References Cited

U.S. PATENT DOCUMENTS

| | | | | |
|---|---|---|---|---|
| 2022/0095268 | A1* | 3/2022 | Oh | H04B 17/345 |
| 2023/0043139 | A1* | 2/2023 | Hwang | H04W 52/0219 |
| 2024/0031934 | A1* | 1/2024 | Si | H04W 4/025 |
| 2024/0039669 | A1* | 2/2024 | Koskela | H04L 5/0094 |
| 2024/0163845 | A1* | 5/2024 | Lei | H04L 5/0053 |
| 2024/0373431 | A1* | 11/2024 | Marinier | H04W 72/21 |

OTHER PUBLICATIONS

OPPO. "Potential paging enhancements"3GPP TSG RAN WG1
104-e R1-2100168, Jan. 18, 2021 (Jan. 18, 2021). entire document.
Qualcomm Incorporated. "TRS/CSI-RS for idle/inactive UE power
saving" 3GPP TSG RAN1#104-bis-e R1-2103178, Apr. 20, 2021
(Apr. 20, 2021). full text.
Vivo. "Paging enhancements for idle/inactive mode UE power
saving" 3GPP TSG RAN1#104-bis-e R1-2102532, Apr. 20, 2021
(Apr. 20, 2021). full text.

* cited by examiner

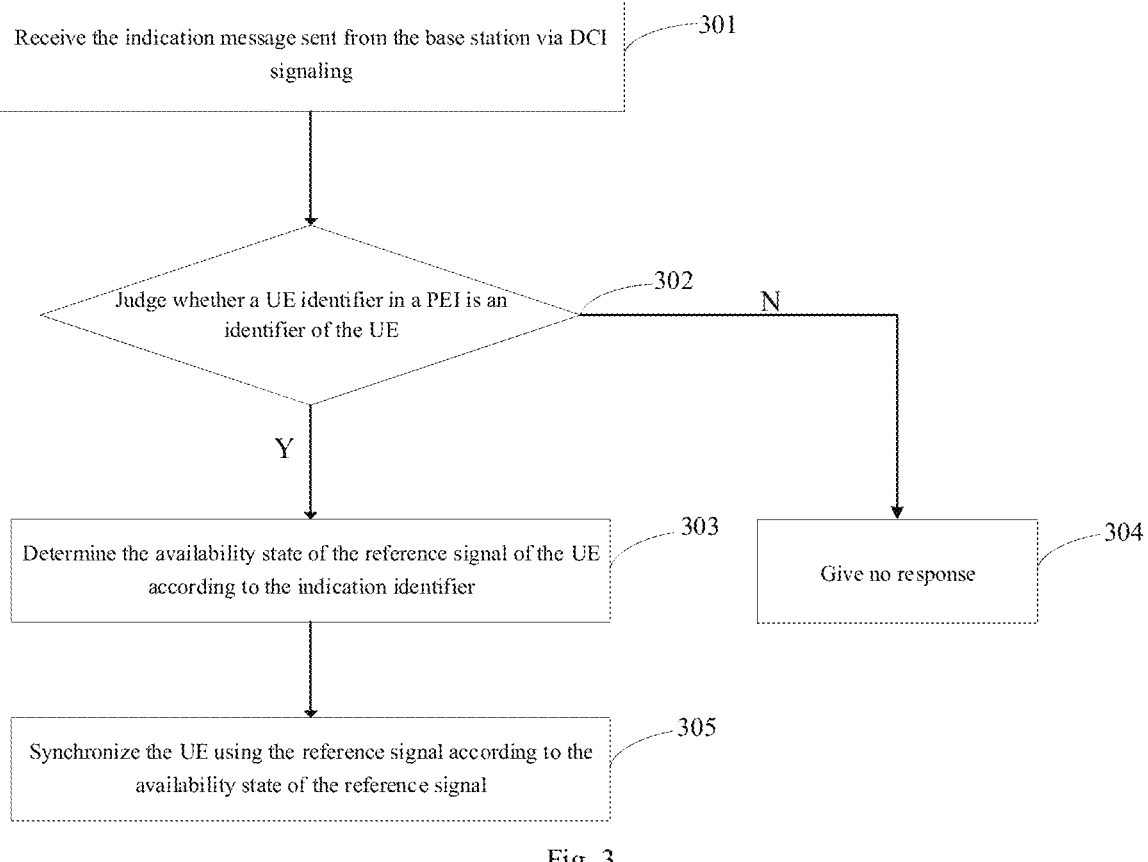

Receive the indication message sent from the base station via DCI signaling — 301

Judge whether a UE identifier in a PEI is an identifier of the UE — 302

N

Y

Determine the availability state of the reference signal of the UE according to the indication identifier — 303

Give no response — 304

Synchronize the UE using the reference signal according to the availability state of the reference signal — 305

Fig. 3

Send the indication message to the UE — 401

Fig. 4

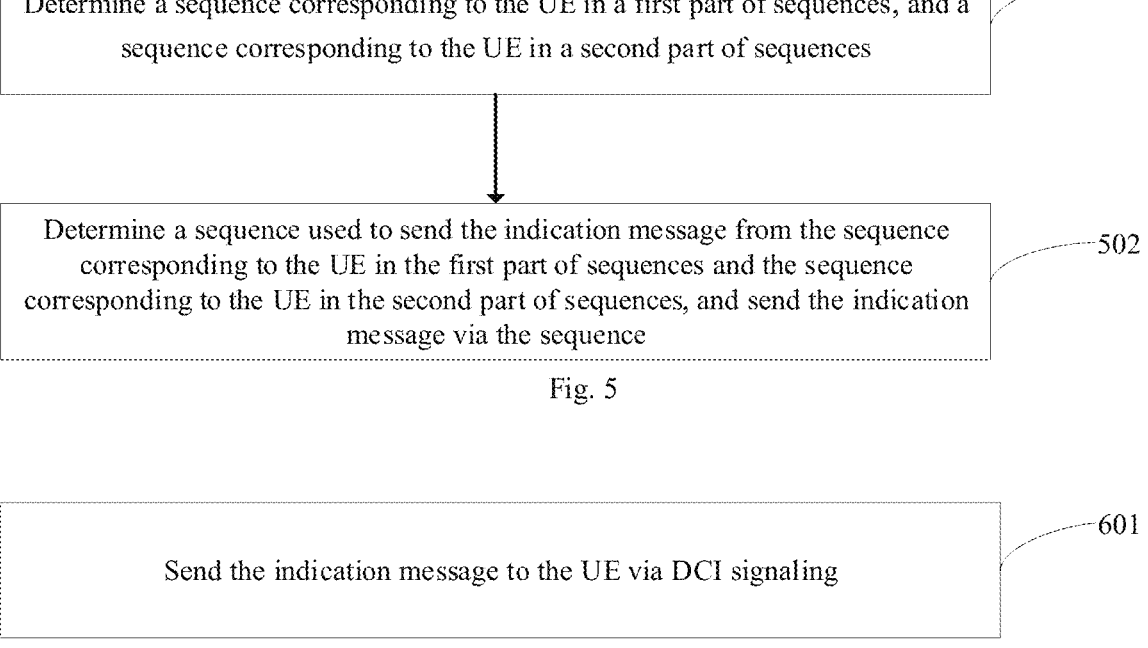

Determine a sequence corresponding to the UE in a first part of sequences, and a sequence corresponding to the UE in a second part of sequences ⟋ 501

Determine a sequence used to send the indication message from the sequence corresponding to the UE in the first part of sequences and the sequence corresponding to the UE in the second part of sequences, and send the indication message via the sequence ⟋ 502

Fig. 5

Send the indication message to the UE via DCI signaling ⟋ 601

Fig. 6

METHOD AND APPARATUSES, USER EQUIPMENT, BASE STATION, AND STORAGE MEDIUM FOR RECEIVING AND SENDING SIGNAL

CROSS REFERENCE TO RELATED APPLICATION

The present application is a U.S. National Stage of International Application No. PCT/CN2021/092509, filed on May 8, 2021, the entire content of which is incorporated herein by reference for all purposes.

BACKGROUND

In the 5th-generation new radio (5GNR), a reference signal, such as a tracking reference signal (TRS)/channel state information-reference signal (CSI-RS), is introduced to synchronize a user equipment (UE) with a network in a time-frequency domain. Typically, a base station needs to indicate an availability state of the TRS/CSI-RS to the UE, so the UE can be synchronized with the network in the time-frequency domain according to the availability state of the TRS/CSI-RS.

SUMMARY

A method for receiving a signal provided in an example of an aspect of the disclosure is performed by a UE, and includes:

receiving an indication message sent from a base station, where the indication message includes a paging early indication (PEI), and the PEI is used to indicate an availability state of a reference signal of the UE; and synchronizing the UE using the reference signal according to the availability state of the reference signal.

A method for sending a signal provided in an example of another aspect of the disclosure is performed by a base station, and includes:

sending an indication message to the UE, where the indication message includes a PEI, and the PEI is used to indicate an availability state of a reference signal of the UE.

A user equipment provided in an example of yet another aspect of the disclosure includes a transceiver, a memory, and a processor that is connected to the transceiver and the memory separately, and is configured to control wireless signal transceiving by the transceiver by executing a computer-executable instruction in the memory, and implements the method provided in the example of the above aspect of the disclosure.

Abase station provided in an example of yet another aspect of the disclosure includes a transceiver, a memory, and a processor that is connected to the transceiver and the memory separately, is configured to control wireless signal transceiving by the transceiver by executing a computer-executable instruction in the memory, and implements the method provided in the example of the above another aspect of the disclosure.

A non-transitory computer-readable storage medium provided in an example of still another aspect of the disclosure stores a computer-executable instruction, and the computer-executable instruction implements the above methods after being executed by a processor.

Additional aspects and advantages of the disclosure will partially be set forth in the following description, will partially become apparent from the following description, or will be learned by practice of the disclosure.

BRIEF DESCRIPTION OF THE DRAWINGS

The foregoing and/or additional aspects and advantages of the disclosure will become apparent and readily appreciated from the following description of the examples in conjunction with the accompanying drawings.

FIG. 3 is a schematic flowchart of a method for receiving a signal provided in yet another example of the disclosure;

FIG. 4 is a schematic flowchart of a method for sending a signal provided in yet another example of the disclosure;

FIG. 5 is a schematic flowchart of a method for sending a signal provided in yet another example of the disclosure;

FIG. 6 is a schematic flowchart of a method for sending a signal provided in still another example of the disclosure;

DETAILED DESCRIPTION

Figure 1:
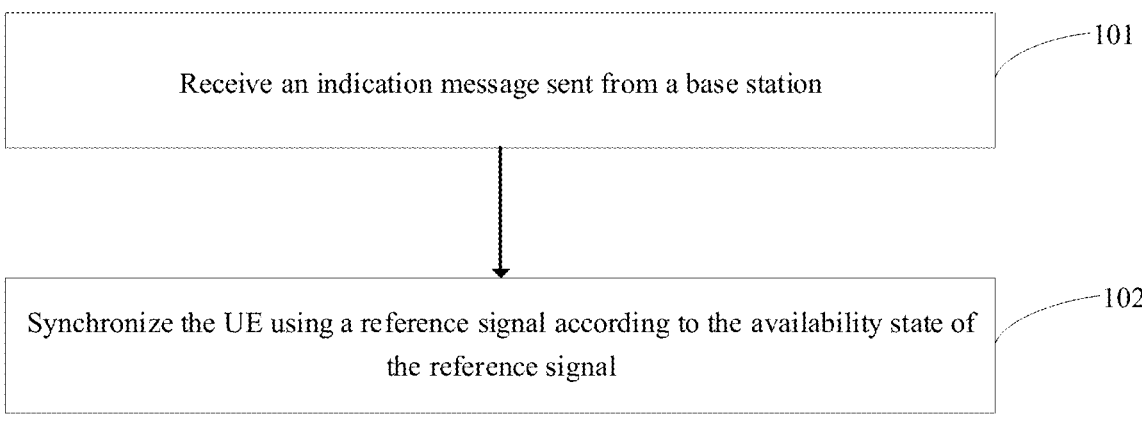
FIG. 1 is a schematic flowchart of a method for receiving a signal provided in an example of the disclosure.

A description will be made in detail to illustrative examples here, instances of which are illustrated in the accompanying drawings. When the following description relates to the accompanying drawings, the same numbers in different accompanying drawings refer to the same or similar elements unless otherwise indicated. Embodiments described in the following illustrative examples do not represent all embodiments consistent with examples of the disclosure. On the contrary, they are merely instances of apparatuses and methods consistent with some aspects of the examples of the disclosure as described in detail in the appended claims.

The term used in the examples of the disclosure is for the purpose of describing particular examples merely and is not intended to limit the examples of the disclosure. As used in the examples and the appended claims of the disclosure, singular forms "a," "an," and "the" are intended to include plural forms as well, unless otherwise clearly indicated in the context. It should be understood that the term "and/or" as used here refers to and encompasses any or all possible combinations of one or more of the associated listed items.

It should be understood that although the terms first, second, third, etc., may be employed in the examples of the disclosure to describe various information, such information should not be limited to these terms. These terms are merely used to distinguish the same type of information from each other. For instance, first information may also be referred to as second information, and similarly, second information may also be referred to as first information, without departing from the scope of the examples of the disclosure. The word "if," as used here, may be construed to mean "at the time of" "when," or "in response to determining," depending on the context.

Examples of the disclosure are described in detail below, and instances of the examples are illustrated in the drawings, in which the same or similar reference numerals refer to the same or similar elements. The examples described below, by reference to the drawings, are illustrative for explaining the disclosure and are not to be construed as limiting the disclosure.

The disclosure relates to the technical field of communication, and particularly relates to a method and apparatus for receiving a signal, a method and apparatus for sending a signal, a user equipment, a base station, and a storage medium.

In the 5th-generation new radio (5GNR), a reference signal, such as a tracking reference signal (TRS)/channel state information-reference signal (CSI-RS), is introduced to synchronize a user equipment (UE) with a network in a time-frequency domain. Typically, a base station needs to indicate an availability state of the TRS/CSI-RS to the UE, so the UE can be synchronized with the network in the time-frequency domain according to the availability state of the TRS/CSI-RS.

A method for indicating an availability state of a TRS/CSI-RS to the UE by a base station is less flexible in the related art.

As for the method for receiving a signal and the method for sending a signal provided in the examples of the disclosure, the user equipment (UE) may receive an indication message sent from a base station, where the indication message includes a paging early indication (PEI), and the PEI is used to indicate an availability state of a reference signal of the UE; and the UE may be synchronized using the reference signal according to the availability state of the reference signal. It can be seen that the example of the disclosure provides a novel method to indicate an availability state of a reference signal. For example, the availability state of the reference signal is indicated by a PEI. Thus, the base station may indicate the availability state of the reference signal to the UE through various methods, and flexibility is high. Moreover, the availability state of the reference signal is sent to the UE. When the reference signal is in an available state, the UE may be synchronized with a network in a time-frequency domain according to the reference signal, such that a wake-up period can be shortened, power consumption can be reduced, and energy and power can be saved.

The disclosure provides a method and apparatus for receiving a signal, a method and apparatus for sending a signal, a user equipment, a base station, and a storage medium that solves one or more technical problems. For example, the technical problems solved include that conventional methods for indicating an availability state of a tracking reference signal (TRS)/channel state information-reference signal (CSI-RS) to the user equipment (UE) by a base station provide low flexibility.

A method for receiving a signal provided in an example of an aspect of the disclosure is performed by the UE, and includes:

receiving an indication message sent from a base station, where the indication message includes a paging early indication (PEI), and the PEI is used to indicate an availability state of a reference signal of the UE; and synchronizing the UE using the reference signal according to the availability state of the reference signal.

A method for sending a signal provided in an example of another aspect of the disclosure is performed by a base station, and includes:

sending an indication message to the UE, where the indication message includes a PEI, and the PEI is used to indicate an availability state of a reference signal of the UE.

An apparatus for receiving a signal provided in an example of yet another aspect of the disclosure includes:

a reception module configured to receive an indication message sent from a base station, where the indication message includes a PEI, and the PEI is used to indicate an availability state of a reference signal of the UE; and a synchronization module configured to synchronize the UE using the reference signal according to the availability state of the reference signal.

An apparatus for sending a signal provided in an example of yet another aspect of the disclosure includes:

a sending module configured to send an indication message to the UE, where the indication message includes a PEI, and the PEI is used to indicate an availability state of a reference signal of the UE.

A user equipment provided in an example of yet another aspect of the disclosure includes a transceiver, a memory, and a processor that is connected to the transceiver and the memory separately, is configured to control wireless signal transceiving by the transceiver by executing a computer-executable instruction in the memory, and implements the method provided in the example of the above aspect of the disclosure.

A base station provided in an example of yet another aspect of the disclosure includes a transceiver, a memory, and a processor that is connected to the transceiver and the memory separately, is configured to control wireless signal transceiving by the transceiver by executing a computer-executable instruction in the memory, and implements the method provided in the example of the above another aspect of the disclosure.

A non-transitory computer-readable storage medium provided in an example of still another aspect of the disclosure stores a computer-executable instruction, and the computer-executable instruction implements the above methods after being executed by a processor.

In summary, according to the method and apparatus for receiving a signal, a method and apparatus for sending a signal, a user equipment, a base station, and a storage medium, the UE may receive an indication message sent by the base station, where the indication message includes a PEI, and the PEI is used to indicate an availability state of a reference signal of the UE; and the UE may be synchronized using the reference signal according to the availability state of the reference signal. It can be seen that the example of the disclosure provides a novel method to indicate an availability state of a reference signal. For example, the availability state of the reference signal is indicated by a PEI. Thus, the base station may indicate the availability state of the reference signal to the UE through various methods, and flexibility is high. Moreover, the availability state of the reference signal is sent to the UE. When the reference signal is in an available state, the UE may be synchronized with a network in a time-frequency domain according to the reference signal, such that a wake-up period can be shortened, power consumption can be reduced, and energy and power can be saved.

A method and apparatus for receiving a signal, a method and apparatus for sending a signal, a user equipment, a base station, and a storage medium provided in the disclosure are described in detail below with reference to the accompanying drawings.

FIG. 1 is a schematic flowchart of a method for receiving a signal provided in an example of the disclosure, which is performed by the UE. As shown in FIG. 1, the method for receiving a signal may include the following steps 101 to 102.

In step 101, receive an indication message sent from a base station.

It may be noted that the method for receiving a signal in the example of the disclosure can be performed by any UE. The UE may be a device that provides speech and/or data connectivity for a user. The UE may communicate with one or more core networks via a radio access network (RAN), and the UE may be an Internet of Things terminal, for instance, a sensor device, a mobile telephone (or referred to as a "cellular" telephone), and a computer having an Internet of Things terminal, for instance, may be a stationary, portable, pocket-sized, hand-held, computer-built, or vehicle-mounted device, for instance, a station (STA), a subscriber unit, a subscriber station, a mobile station, a mobile, a remote station, an access point, a remote terminal, an access terminal, a user terminal, or a user agent. Alternatively, the UE may also be a device of an unmanned aerial vehicle. Alternatively, the UE may also be a vehicle-mounted device, for instance, a trip computer having a radio communication function, or a radio communication device externally connected to the trip computer. Alternatively, the UE may also be a roadside device, for instance, a street lamp, a signal lamp, or another roadside device, with the radio communication function.

Moreover, in an example of the disclosure, the indication message may include a paging early indication (PEI), and the PEI may be used to indicate an availability state of a reference signal of the UE, such that the UE may be synchronized with a network in a time-frequency domain according to the availability state of the reference signal. The availability state of the reference signal may include the reference signal available or unavailable. When the reference signal is available, the UE may be synchronized with a network in a time-frequency domain according to the reference signal. In an example of the disclosure, the reference signal may include at least one of TRS, CSI-RS, and a secondary synchronization signal (SSS).

Methods for the UE to receive an indication message sent from a base station may include, but are not limited to, the following methods.

In an example of the disclosure, the UE may receive the indication message sent by the base station via a sequence. In an example of the disclosure, the sequence may be used to indicate the availability state of the reference signal of the UE.

In another example, the UE may receive the indication message sent by the base station via downlink control information (DCI) signaling. In an example of the disclosure, the DCI signaling may include paging downlink control information (paging DCI). Further, in an example of the disclosure, the DCI signaling may be used to indicate the availability state of the reference signal of the UE.

It may be noted that in an example of the disclosure, the UE may receive the indication message sent by the base station when the UE is in an idle state/inactive state.

In step 102, synchronize the UE using a reference signal according to the availability state of the reference signal.

In summary, as for the method for receiving a signal provided in the example of the disclosure, the UE may receive an indication message sent from a base station, where the indication message includes a PEI, and the PEI is used to indicate an availability state of a reference signal of the UE; and the UE may be synchronized using the reference signal according to the availability state of the reference signal. It can be seen that the example of the disclosure provides a method to indicate the availability state of a reference signal. For example, the availability state of the reference signal is indicated by a PEI. Thus, the base station may indicate the availability state of the reference signal to the UE through various methods, and flexibility is high. Moreover, the availability state of the reference signal is sent to the UE. When the reference signal is in an available state, the UE may be synchronized with a network in a time-frequency domain according to the reference signal, such that a wake-up period can be shortened, power consumption can be reduced, and energy and power can be saved.

Figure 2A:
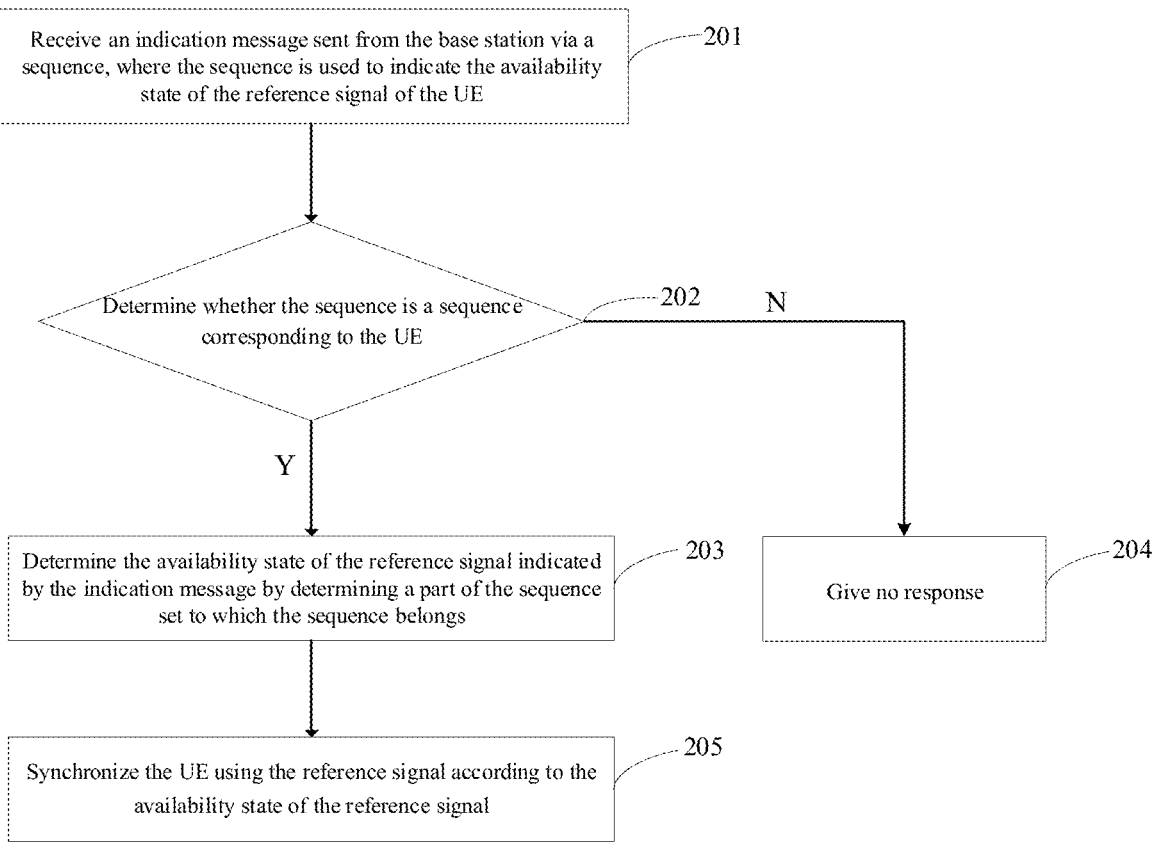
FIG. 2a is a schematic flowchart of a method for receiving a signal provided in another example of the disclosure.

FIG. 2a is a schematic flowchart of a method for receiving a signal provided in another example of the disclosure, which is performed by the UE. As shown in FIG. 2a, the method for receiving a signal may include the following steps 201 to 205.

In step 201, receive an indication message sent from the base station via a sequence, where the sequence is used to indicate the availability state of the reference signal of the UE.

It may be noted that in an example of the disclosure, the indication message may include a PEI. Moreover, in an example of the disclosure, the sequence may be used to carry the PEI and thus send the PEI.

Further, in an example of the disclosure, the sequence may be included in a sequence set. The sequence set may include a first part of sequences and a second part of sequences. The first part of sequences and the second part of sequences may each include N groups of sequences, and N is a positive integer. Each group of sequences may include n bits, where n is an integer and $n \geq 1$. In an example of the disclosure, UEs corresponding to a physical downlink control channel (PDCCH) may be grouped to obtain N groups of UEs, where each group of UEs may include at least one UE. In an example of the disclosure, when the UEs corresponding to the PDCCH are grouped, different UE groups may include the same number of UEs. For instance, each UE group may include two UEs. In another example of the disclosure, different UE groups may include different numbers of UEs. For example, one group of UEs may include two UEs, and another group of UEs may include one UE. Moreover, in an example of the disclosure, each group of UEs in the N groups of UEs may correspond to a group of sequences respectively, such that when the base station sends a PEI to the UE via a sequence, the UE group may determine whether the PEI is sent to the UE group itself according to a corresponding relation between the UE group and the sequence group.

Furthermore, in an example of the disclosure, N groups of sequences in the first part of sequences are separately used to indicate that reference signals of corresponding UE groups are in an available state; and N groups of sequences in the second part of sequences are separately used to indicate that reference signals of corresponding UE groups are in an unavailable state.

Thus, in an example of the disclosure, the UE in response to determining that the PEI is sent to the UE itself, the UE may further determine that the availability state of the reference signal indicated by the PEI is an available state or an unavailable state by determining the part of the sequence set to which the sequence used to send the PEI belongs (for instance, the first part of sequences or the second part of sequences).

It may be noted that in an example of the disclosure, the first part of sequences may be some sequences in the sequence set, and the second part of sequences may be the other sequences in the sequence set. Illustratively, in an example of the disclosure, the first part of sequences may include sequences of a first half of the sequence set, and the second part of sequences may include sequences of a second half of the sequence set.

It may also be noted that in an example of the disclosure, the number of sequences included in the first part of sequences and the second part of sequences may be equal, and a grouping mode of sequences in the first part of sequences and the second part of sequences may also be consistent.

Further, a grouping method for the first part of sequences and the second part of sequences of the above method is illustrated by way of an example.

Figure 2B:
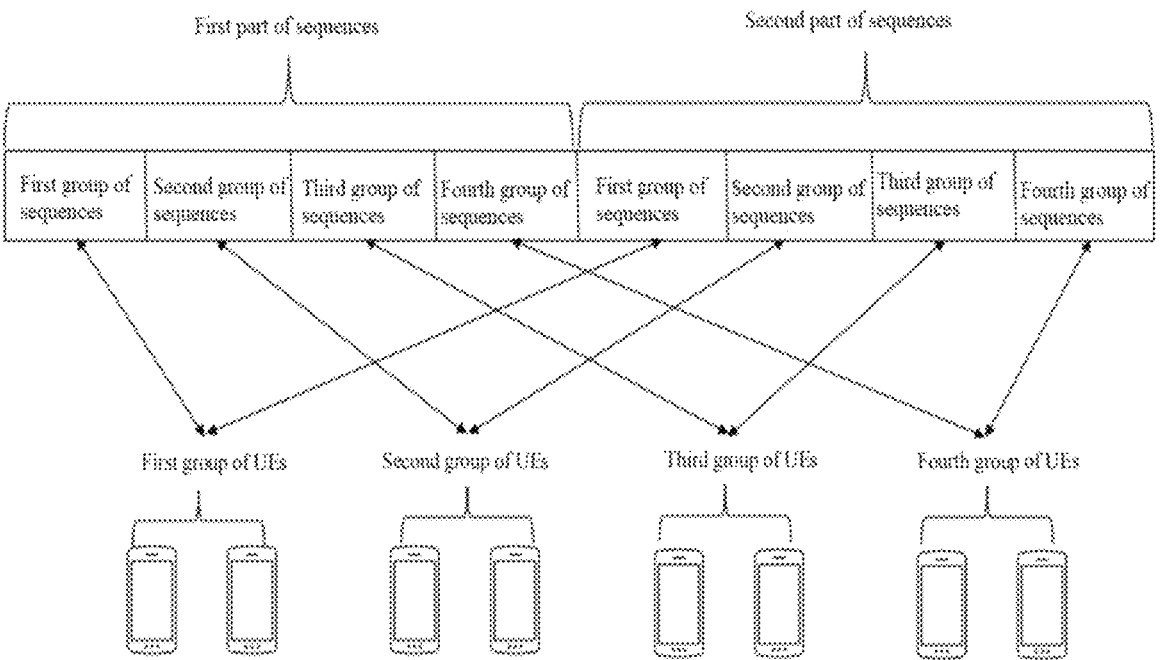
FIG. 2b is a diagram of corresponding relations between sequence groups and UE groups provided in an example of the disclosure.

FIG. 2b is a diagram of corresponding relations between sequence groups and UE groups provided in an example of the disclosure. As shown in FIG. 2b, in a case where four groups of UEs are obtained after UEs corresponding to the PDCCH are grouped, and each group of UEs includes two UEs, in an example of the disclosure, the first part of sequences may be divided into four groups of sequences, and the second part of sequences may also be divided into four groups of sequences. The first groups of sequences in the first part of sequences may correspond to a first group of UEs and may be used to indicate that reference signals of the first group of UEs are available; and the first group of sequences in the second part of sequences may correspond to the first group of UEs and may be used to indicate that the reference signals of the first group of UEs are unavailable. The second group of sequences in the first part of sequences may correspond to a second group of UEs and may be used to indicate that reference signals of the second group of UEs are available; and the second group of sequences in the second part of sequences may correspond to the second group of UEs and may be used to indicate that reference signals for the second group of UEs are unavailable.

In step 202, determine whether the sequence used to send an indication message is a sequence corresponding to the UE.

It may be noted that in an example, when the base station sends the indication message to the UE via the sequence, the indication message is sent to all UEs. In view of this, the UE receiving the indication message needs to determine whether the indication message is sent to the UE.

In an example of the disclosure, a method for determining, by the UE, whether the indication message is sent to the UE may include: determining whether the sequence used to send the indication message is a sequence corresponding to the UE. In an example of the disclosure, in response to determining that the sequence is a sequence corresponding to the UE, it is determined that the indication message is sent by the base station to the UE, and then the UE continues to execute step 203. Otherwise, it is determined that the indication message is not sent to the UE, and step 204 is executed.

For instance, in a case where the sequence used to send the indication message is the first group of sequences in the first part of sequences, the base station sends the indication message to all UEs via the first group of sequences in the first part of sequences. When the first group of UEs receives the indication message, since the first group of sequences in the first part of sequences corresponds to the first group of UEs, the first group of UEs may determine that the indication message is sent to the first group of UEs. When the second group of UEs receives the indication message, since the first group of sequences in the first part of sequences does not correspond to the second group of UEs, the second group of UEs may determine that the indication message is not sent to the second group of UEs.

In step 203, determine the availability state of the reference signal indicated by the indication message by determining a part of the sequence set to which the sequence used to send the indication message belongs.

In an example of the disclosure, it is determined that the reference signal of the UE is in an available state in response to determining that the sequence used to send the indication message belongs to the first part of sequences of the sequence set; and alternatively, it is determined that the reference signal of the UE is in an unavailable state in response to determining that the sequence used to send the indication message belongs to the second part of sequences of the sequence set.

For instance, for the first group of UEs, in response to determining that the sequence used to send the indication message is the first group of sequences in the first part of sequences, it may be determined that the reference signals of the first group of UEs are available. In response to determining that the sequence used to send the indication message is the first group of sequences in the second part of sequences, it may be determined that the reference signals of the first group of UEs are unavailable.

Further, it may be noted that in an example of the disclosure, by grouping UEs, each group of UEs has a corresponding sequence group. Thus, when the UE needs to be woken up subsequently, only all UEs in the UE group to which the UE belongs need to be woken up, and not all UEs need to be woken up, such that power consumption can be saved and cost can be reduced.

In step 204, give no response.

In step 205, synchronize the UE using the reference signal according to the availability state of the reference signal.

In summary, as for the method for receiving a signal provided in the example of the disclosure, the UE may receive an indication message sent from a base station, where the indication message includes a PEI, and the PEI is used to indicate an availability state of a reference signal of the UE; and the UE may be synchronized using the reference signal according to the availability state of the reference signal. It can be seen that the example of the disclosure provides a novel method to indicate the availability state of a reference signal. For example, the availability state of the reference signal is indicated by a PEI. Thus, the base station may indicate the availability state of the reference signal to the UE through various methods, and flexibility is high. Moreover, the availability state of the reference signal is sent to the UE. When the reference signal is in an available state, the UE may be synchronized with a network in a time-frequency domain according to the reference signal, such that a wake-up period can be shortened, power consumption can be reduced, and energy and power can be saved.

FIG. 3 is a schematic flowchart of a method for receiving a signal provided in yet another example of the disclosure, which is performed by the UE. As shown in FIG. 3, the method for receiving a signal may include the following steps 301 to 305.

In step 301, receive the indication message sent from the base station via DCI signaling.

In an example of the disclosure, reference may be made to the first example for a detailed description of the UE, which is not repeated in the example of the disclosure.

Furthermore, in an example of the disclosure, the indication message may be included in the DCI signaling. Moreover, in an example of the disclosure, when the base station sends the indication message via the DCI signaling, a PEI in the indication message may include a UE identifier and an indication identifier. The UE identifier may be used to indicate a UE receiving the PEI, and the indication identifier may be used to indicate the availability state of a reference signal of the UE indicated by the UE identifier. Furthermore, in an example of the disclosure, the DCI signaling may include paging DCI.

Thus, in an example of the disclosure, after receiving the indication message sent by the base station via the DCI signaling, the UE may determine the availability state of the reference signal according to the UE identifier and the indication identifier in the received indication message.

Further, in an example of the disclosure, the indication identifier may include m bits, where m is an integer, and $m \geq 1$.

Furthermore, in an example of the disclosure, when m=1, in a case where the indication identifier is 1, the indication identifier may indicate that the reference signal is available; and in a case where the indication identifier is 0, the indication identifier may indicate that the reference signal is unavailable.

In step 302, judge whether a UE identifier in a PEI is an identifier of the UE.

In an example of the disclosure, in response to determining that receiving the indication message sent by the base station via the DCI signaling, the UE may judge whether the indication message is sent to the UE by judging whether the UE identifier in the indication message is an identifier of the UE. In an example of the disclosure, in response to determining that the UE identifier is the identifier of the UE, it is determined that the indication message is sent to the UE, and step 303 is further executed. In response to determining that the UE identifier is not the identifier of the UE, it is determined that the indication message is not sent to the UE, and step 304 is executed.

In step 303, determine the availability state of the reference signal of the UE according to the indication identifier.

In an example of the disclosure, the availability state of the reference signal indicated by the indication identifier may be determined as an availability state of a reference signal of the UE.

For instance, in a case where the indication identifier includes one bit, if the indication identifier in the indication message received by the UE is 1, it indicates that the reference signal of the UE is available. If the indication identifier in the indication message received by the UE is 0, it indicates that the reference signal of the UE is unavailable.

In step 304, give no response.

In step 305, synchronize the UE using the reference signal according to the availability state of the reference signal.

In summary, as for the method for receiving a signal provided in the example of the disclosure, the UE may receive an indication message sent from a base station, where the indication message includes a PEI, and the PEI is used to indicate an availability state of a reference signal of the UE; and the UE may be synchronized using the reference signal according to the availability state of the reference signal. It can be seen that the example of the disclosure provides a novel method to indicate the availability state of a reference signal. For example, the availability state of the reference signal is indicated by a PEI. Thus, the base station may indicate the availability state of the reference signal to the UE through various methods, and flexibility is high. Moreover, the availability state of the reference signal is sent to the UE. When the reference signal is in an available state, the UE may be synchronized with a network in a time-frequency domain according to the reference signal, such that a wake-up period can be shortened, power consumption can be reduced, and energy and power can be saved.

FIG. 4 is a schematic flowchart of a method for sending a signal provided in yet another example of the disclosure, which is performed by a base station. As shown in FIG. 4, the method for sending a signal may include the following step 401.

In step 401, send the indication message to the UE.

In an example of the disclosure, reference may be made to the first example for a detailed description of the UE, which is not repeated in the example of the disclosure.

Moreover, in an example of the disclosure, the indication message may include a PEI, and the PEI may be used to indicate an availability state of a reference signal of the UE, such that the UE may be synchronized with a network in a time-frequency domain according to the availability state of the reference signal. The availability state of the reference signal may include the reference signal available or unavailable. When the reference signal is available, the UE may be synchronized with a network in a time-frequency domain according to the reference signal. In an example of the disclosure, the reference signal may include at least one of TRS, CSI-RS, or a secondary synchronization signal (SSS).

Methods for the base station to send an indication message to the UE may include, but are not limited to, the following methods.

In an example of the disclosure, the base station may send the indication message to the UE via a sequence. In an example of the disclosure, the sequence may be used to indicate the availability state of the reference signal of the UE.

In another example of the disclosure, the base station may send the indication message to the UE via DCI signaling. In an example of the disclosure, the DCI signaling may include paging DCI. Further, in an example of the disclosure, the DCI may also be used to indicate the availability state of the reference signal of the UE.

In summary, as for the method for sending a signal provided in the example of the disclosure, the UE may receive an indication message sent from a base station, where the indication message includes a PEI, and the PEI is used to indicate an availability state of a reference signal of the UE; and the UE may be synchronized using the reference signal according to the availability state of the reference signal. It can be seen that the example of the disclosure provides a novel method to indicate the availability state of a reference signal. For example, the availability state of the reference signal is indicated by a PEI. Thus, the base station may indicate the availability state of the reference signal to the UE through various methods, and flexibility is high. Moreover, the availability state of the reference signal is sent to the UE. When the reference signal is in an available state, the UE may be synchronized with a network in a time-frequency domain according to the reference signal, such that a wake-up period can be shortened, power consumption can be reduced, and energy and power can be saved.

FIG. 5 is a schematic flowchart of a method for sending a signal provided in yet another example of the disclosure, which is performed by a base station. As shown in FIG. 5, the method for sending a signal may include the following steps 501 and 502.

In step 501, determine a sequence corresponding to the UE in a first part of sequences, and a sequence corresponding to the UE in a second part of sequences.

In an example of the disclosure, the first part of sequences and the second part of sequences may be included in a sequence set. The first part of sequences and the second part of sequences may each include N groups of sequences, and N is a positive integer. Each group of sequences may include n bits, where n is an integer and n≥1. In an example of the disclosure, N groups of UEs are obtained by grouping UEs corresponding to the PDCCH, and each group of UEs includes at least one UE. Moreover, in an example of the disclosure, each group of UEs in the N groups of UEs may correspond to a group of sequences respectively, such that when the base station sends a PEI to the UE via a sequence, the UE group may determine whether the PEI is sent to the UE group itself according to a corresponding relation between the UE group and the sequence group.

Furthermore, in an example of the disclosure, N groups of sequences in the first part of sequences are separately used to indicate that reference signals of corresponding UE groups are in an available state; and N groups of sequences in the second part of sequences are separately used to indicate that reference signals of corresponding UE groups are in an unavailable state.

It may be noted that in an example of the disclosure, the first part of sequences may be some sequences in the sequence set, and the second part of sequences may be the other sequences in the sequence set. Illustratively, in an example of the disclosure, the first part of sequences may include sequences of a first half of the sequence set, and the second part of sequences may include sequences of a second half of the sequence set. It may be noted that the number of sequences included in the first part of sequences and the second part of sequences may be equal, and a grouping mode of sequences in the first part of sequences and the second part of sequences may also be consistent.

Further, a grouping method for the first part of sequences and the second part of sequences of the above method is illustrated by way of an example.

In a case where four groups of UEs are obtained after the UEs corresponding to the PDCCH are grouped, and each group of UEs includes two UEs, in an example of the disclosure, the first part of sequences may be divided into four groups of sequences, and the second part of sequences may also be divided into four groups of sequences. The first group of sequences in the first part of sequences may correspond to a first group of UEs and may be used to indicate that reference signals of the first group of UEs are available; and the first group of sequences in the second part of sequences may correspond to the first group of UEs and may be used to indicate that the reference signals of the first group of UEs are unavailable. The second group of sequences in the first part of sequences may correspond to a second group of UEs and may be used to indicate that reference signals of the second group of UEs are available; and the second group of sequences in the second part of sequences may correspond to the second group of UEs and may be used to indicate that reference signals for the second group of UEs are unavailable.

Further, in an example of the disclosure, for instance, the step of determining a sequence corresponding to the UE in a first part of sequences, and a sequence corresponding to the UE in a second part of sequences may include: in response to determining that the UE is in the first group of UEs, the first group of sequences in the first part of sequences may be determined as a sequence corresponding to the first group of UEs and located in the first part of sequences, and the first group of sequences in the second part of sequences may be determined as a sequence corresponding to the first group of UEs and located in the second part of sequences; and in response to determining that the UE is in the second group of UEs, the second group of sequences in the first part of sequences may be determined as a sequence corresponding to the second group of UEs and located in the first part of sequences, and the second group of sequences in the second part of sequences may be determined as a sequence corresponding to the second group of UEs and located in the second part of sequences.

In step 502, determine a sequence used to send the indication message from the sequence corresponding to the UE in the first part of sequences and the sequence corresponding to the UE in the second part of sequences, and send the indication message via the sequence.

In an example of the disclosure, the step of determining a sequence used to send an indication message may include: when a base station needs to indicate that a reference signal of the UE is in an available state, determine the sequence corresponding to the UE in the first part of sequences as a sequence used to send the indication message, and send the indication message via the sequence; and alternatively, when a base station needs to indicate that a reference signal of the UE is in an unavailable state, determine the sequence corresponding to the UE in the second part of sequences as a sequence for used to send the indication message, and send the indication message via the sequence.

For instance, as for the first group of UEs, in a case where the base station needs to indicate that the reference signals of the first group of UEs are in an available state, the indication message may be sent using the first group of sequences in the first part of the sequences. In a case where the base station needs to indicate that the reference signals of the first group of UEs are in an unavailable state, the indication message may be sent using the first group of sequences in the second part of sequences.

It may be noted that in an example of the disclosure, the indication message may include a PEI. Moreover, in an example of the disclosure, the sequence used to send the indication message may be used to carry the PEI and thus send the PEI.

Furthermore, in an example of the disclosure, the base station may send the indication message to the UE in an idle state/inactive state.

In summary, as for the method for sending a signal provided in the example of the disclosure, the UE may receive an indication message sent from a base station, where the indication message includes a PEI, and the PEI is used to indicate an availability state of a reference signal of the UE; and the UE may be synchronized using the reference signal according to the availability state of the reference signal. It can be seen that the example of the disclosure provides a novel method to indicate the availability state of a reference signal. For example, the availability state of the reference signal is indicated by a PEI. Thus, the base station may indicate the availability state of the reference signal to the UE through various methods, and flexibility is high. Moreover, the availability state of the reference signal is sent to the UE. When the reference signal is in an available state, the UE may be synchronized with a network in a time-frequency domain according to the reference signal, such that a wake-up period can be shortened, power consumption can be reduced, and energy and power can be saved.

FIG. 6 is a schematic flowchart of a method for sending a signal provided in yet another example of the disclosure, which is performed by a base station. As shown in FIG. 6, the method for sending a signal may include the following step 601.

In step 601, send the indication message to the UE via DCI signaling.

It may be noted that in an example of the disclosure, the indication message may be included in the DCI signaling. Moreover, in an example of the disclosure, a PEI in the indication message may include an indication identifier and a UE identifier. The UE identifier may be used to indicate the UE receiving the PEI, and the indication identifier may be used to indicate an availability state of a reference signal of the UE indicated by the UE identifier. Furthermore, in an example of the disclosure, the DCI signaling may include paging DCI.

Thus, in an example of the disclosure, after the base station sends the indication message via the DCI signaling, the UE may determine the availability state of the reference signal according to the UE identifier and the indication identifier in the received indication message.

Further, in an example of the disclosure, the indication identifier may include m bits, where m is an integer, and m≥1.

Furthermore, in an example of the disclosure, when m=1, in a case where the indication identifier is 1, the indication identifier may indicate that the reference signal is available; and in a case where the indication identifier is 0, the indication identifier may indicate that the reference signal is unavailable.

In summary, as for the method for sending a signal provided in the example of the disclosure, the UE may receive an indication message sent from a base station, where the indication message includes a PEI, and the PEI is used to indicate an availability state of a reference signal of the UE; and the UE may be synchronized using the reference signal according to the availability state of the reference signal. It can be seen that the example of the disclosure provides a novel method to indicate the availability state of a reference signal. For example, the availability state of the reference signal is indicated by a PEI. Thus, the base station may indicate the availability state of the reference signal to the UE through various methods, and flexibility is high. Moreover, the availability state of the reference signal is sent to the UE. When the reference signal is in an available state, the UE may be synchronized with a network in a time-frequency domain according to the reference signal, such that a wake-up period can be shortened, power consumption can be reduced, and energy and power can be saved.

Figure 7:
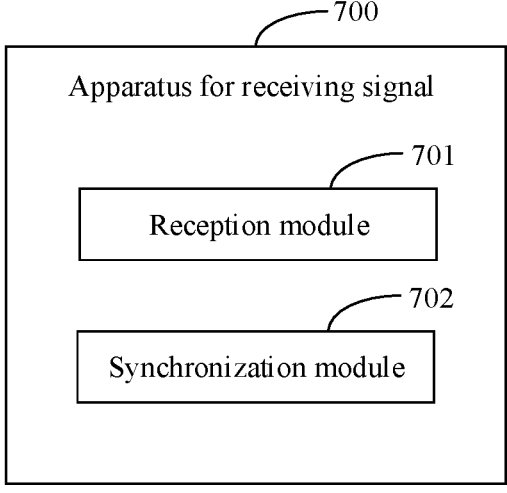
FIG. 7 is a schematic structural diagram of an apparatus for receiving a signal provided in an example of the disclosure.

FIG. 7 is a schematic structural diagram of an apparatus for receiving a signal provided in an example of the disclosure. As shown in FIG. 7, the apparatus 700 may include:

a reception module 701 configured to receive an indication message sent from a base station, where the indication message includes a PEI, and the PEI is used to indicate an availability state of a reference signal of the UE; and a synchronization module 702 configured to synchronize the UE using the reference signal according to the availability state of the reference signal.

In summary, as for the apparatus for receiving a signal provided in the example of the disclosure, the UE may receive an indication message sent by the base station, where the indication message includes the PEI, and the PEI is used to indicate the availability state of the reference signal of the UE; and the UE may be synchronized using the reference signal according to the availability state of the reference signal. It can be seen that the example of the disclosure provides a novel method to indicate the availability state of a reference signal. For example, the availability state of the reference signal is indicated by a PEI. Thus, the base station may indicate the availability state of the reference signal to the UE through various methods, and flexibility is high. Moreover, the availability state of the reference signal is sent to the UE. When the reference signal is in an available state, the UE may be synchronized with a network in a time-frequency domain according to the reference signal, such that a wake-up period can be shortened, power consumption can be reduced, and energy and power can be saved.

In an example of the disclosure, the reception module 701 is further configured to receive the indication message sent by the base station via a sequence, where the sequence is used to indicate the availability state of the reference signal of the UE.

Further, in another example of the disclosure, the sequence is included in a sequence set, the sequence set includes a first part of sequences and a second part of sequences, the first part of sequences and the second part of sequences each include N groups of sequences, N is a positive integer, and each group of sequences in the N groups of sequences separately corresponds to one group of UEs.

Further, in another example of the disclosure, N groups of sequences in the first part of sequences are separately used to indicate that reference signals of corresponding UE groups are in an available state; and N groups of sequences in the second part of sequences are separately used to indicate that reference signals of corresponding UE groups are in an unavailable state.

Further, in another example of the disclosure, after receiving the indication message sent by the base station via the sequence, the apparatus is further configured to determine whether the sequence is a sequence corresponding to the UE.

Further, in another example of the disclosure, the apparatus further includes:

a determination module configured to determine whether the sequence is a sequence corresponding to the UE; and a processing module configured to determine a part of the sequence set to which the sequence belongs when the sequence is a sequence corresponding to the UE; determine that the reference signal of the UE is in an available state when the sequence belongs to the first part of sequences of the sequence set; and alternatively, determine that the reference signal of the UE is in an unavailable state when the sequence belongs to the second part of sequences of the sequence set.

Further, in another example of the disclosure, the first part of sequences may include sequences of a first half of the sequence set, and the second part of sequences may include sequences of a second half of the sequence set.

Further, in another example of the disclosure, the grouping of UEs is determined as follows:

obtain N groups of UEs by grouping UEs corresponding to the PDCCH.

Further, in another example of the disclosure, the reception module 701 is further configured to receive the indication message sent by the base station via downlink control information (DCI) signaling, where the PEI in the indication message includes an indication identifier, and the indication identifier is used to indicate the availability state of the reference signal of the UE.

Further, in another example of the disclosure, the PEI further includes a UE identifier. The indication identifier in the PEI is used to indicate the availability state of the reference signal of the UE indicated by the UE identifier.

Further, in another example of the disclosure, the apparatus further includes:

a judgment module configured to judge whether the UE identifier in the PEI is an identifier of the UE; and a determination module configured to determine the availability state of the reference signal of the UE according to the indication identifier when the UE identifier is the identifier of the UE.

Further, in another example of the disclosure, the reference signal includes at least one of a TRS, a CSI-RS, and an SSS.

Figure 8:
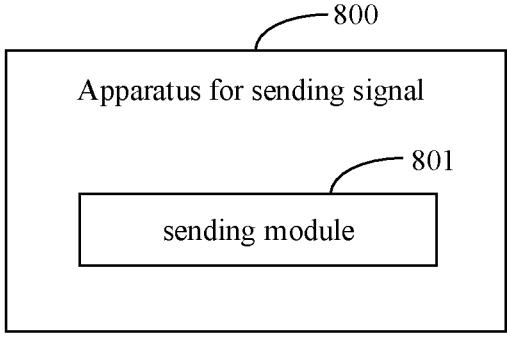
FIG. 8 is a schematic structural diagram of an apparatus for sending a signal provided in another example of the disclosure.

FIG. 8 is a schematic structural diagram of an apparatus for sending a signal provided in another example of the disclosure. As shown in FIG. 8, the apparatus 800 may include:

a sending module 801 configured to send an indication message to the UE, where the indication message includes a PEI, and the PEI is used to indicate an availability state of a reference signal of the UE.

In summary, as for the apparatus for sending a signal provided in the example of the disclosure, the UE may receive an indication message sent by the base station, where the indication message includes the PEI, and the PEI is used to indicate the availability state of the reference signal of the UE; and the UE may be synchronized using the reference signal according to the availability state of the reference signal. It can be seen that the example of the disclosure provides a novel method to indicate the availability state of a reference signal. For example, the availability state of the reference signal is indicated by a PEI. Thus, the base station may indicate the availability state of the reference signal to the UE through various methods, and flexibility is high. Moreover, the availability state of the reference signal is sent to the UE. When the reference signal is in an available state, the UE may be synchronized with a network in a time-frequency domain according to the reference signal, such that a wake-up period can be shortened, power consumption can be reduced, and energy and power can be saved.

In an example of the disclosure, the indication message may be included in a system message.

Further, in another example of the disclosure, the sending module 801 is further configured to send the indication message to the UE via a sequence.

Further, in another example of the disclosure, the sequence is included in a sequence set, the sequence set includes a first part of sequences and a second part of sequences, the first part of sequences and the second part of sequences each include N groups of sequences, N is a positive integer, and each group of sequences in the N groups of sequences separately corresponds to one group of UEs, Further, in another example of the disclosure, N groups of sequences in the first part of sequences are separately used to indicate that reference signals of corresponding UE groups are in an available state; and N groups of sequences in the second part of sequences are separately used to indicate that reference signals of corresponding UE groups are in an unavailable state.

Further, in another example of the disclosure, the apparatus is further configured to determine a sequence corresponding to the UE in the first part of sequences, and a sequence corresponding to the UE in the second part of sequences;

send the indication message by using the sequence corresponding to the UE in the first part of sequences in a case where the base station needs to indicate that the reference signal of the UE is in an available state; and alternatively, send the indication message by using the sequence corresponding to the UE in the second part of sequences in a case where the base station needs to indicate that the reference signal of the UE is in an available state.

Further, in another example of the disclosure, the first part of sequences may include sequences of a first half of the sequence set, and the second part of sequences may include sequences of a second half of the sequence set.

Further, in another example of the disclosure, the N groups of UEs are obtained by grouping UEs corresponding to the PDCCH.

Further, in another example of the disclosure, the sending module 802 is further configured to send the indication message to the UE via DCI signaling, where the PEI in the indication message includes an indication identifier, and the indication identifier is used to indicate the availability state of the reference signal of the UE.

Further, in another example of the disclosure, the PEI further includes a UE identifier. The indication identifier in the PEI is used to indicate the availability state of the reference signal of the UE indicated by the UE identifier.

Further, in another example of the disclosure, the reference signal includes at least one of a TRS, a CSI-RS, and an SSS.

In order to implement the above examples, the disclosure further provides a non-transitory computer-readable storage medium.

The non-transitory computer-readable storage medium provided in the example of the disclosure stores an executable program. The executable program may implement any one of the methods in FIGS. 1 to 3 or FIGS. 4 to 6 after being executed by a processor.

In order to implement the above examples, the disclosure further provides a computer program product, including a computer program. The computer program implements the method as shown in any one of FIG. 1 to 3 or 4 to 6 when executed by a processor.

Furthermore, in order to implement the above examples, the disclosure further provides a computer program. The program implements the method as shown in any one of FIG. 1 to 3 or 4 to 6 when executed by a processor.

Figure 9:
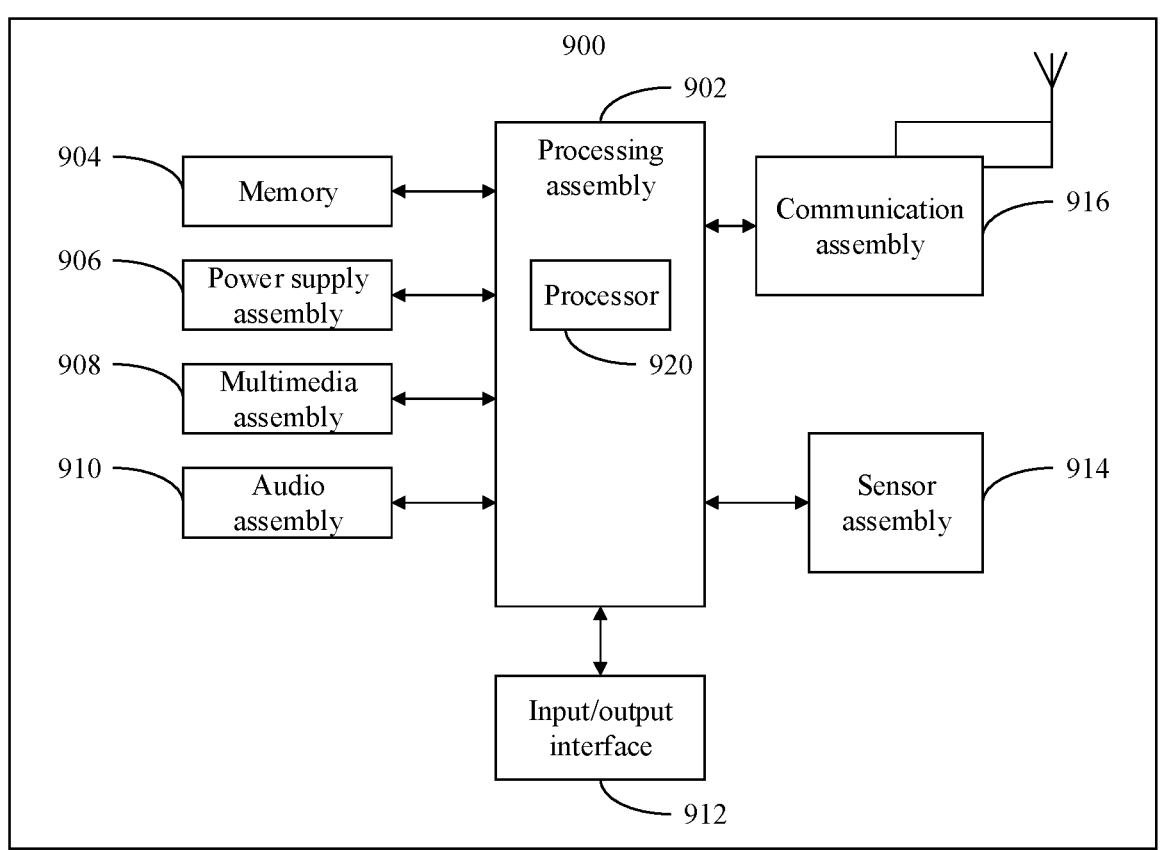
FIG. 9 is a block diagram of a user equipment provided in an example of the disclosure.

FIG. 9 is a block diagram of a user equipment (UE) 900 according to an example of the disclosure. For instance, the UE 900 may be a mobile phone, a computer, a digital broadcast terminal device, a messaging device, a gaming console, a tablet device, a medical device, a fitness device, a personal digital assistant, etc.

With reference to FIG. 9, the UE 900 may include at least one of a processing assembly 902, a memory 904, a power supply assembly 906, a multimedia assembly 908, an audio assembly 910, an input/output (I/O) interface 912, a sensor assembly 913, and a communication assembly 916.

The processing assembly 902 generally controls overall operation of the UE 900, for instance, operation associated with display, phone calls, data communications, camera operations, and recording operations. The processing assembly 902 may include at least one processor 920 to execute an instruction, to complete all or part of the steps of the method above. Moreover, the processing assembly 902 may include at least one module to facilitate interaction between the processing assembly 902 and other assemblies. For instance, the processing assembly 902 may include the multimedia module to facilitate interaction between the multimedia assembly 908 and the processing assembly 902.

The memory 904 is configured to store various types of data to support operation on the UE 900. Instances of such data include an instruction, operated on the UE 900, for any application or method, contact data, phonebook data, messages, pictures, video, etc. The memory 904 may be implemented by any type of volatile or non-volatile memory device, or a combination of them, for instance, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply assembly 906 supplies power to the various assemblies of the UE 900. The power supply assembly 906 may include a power management system, at least one power supply, and other assemblies associated with power generation, management, and distribution for the UE 900.

The multimedia assembly 908 includes a screen that provides an output interface between the UE 900 and the user. In some examples, the screen may include a liquid crystal display (LCD) and a touch panel (TP). If the screen includes a touch panel, the screen may be implemented as a touch screen, so as to receive an input signal from a user. The touch panel includes at least one touch sensor to sense touches, slides, and gestures on the touch panel. The touch sensor may sense a boundary of a touch or swipe, and may also measure wake-up time and pressure associated with the touch or swipe. In some examples, the multimedia assembly 908 includes a front-facing camera and/or a rear-facing camera. When the UE 900 is in an operational mode, for instance, a photographing mode or a video mode, the front-facing camera and/or the rear-facing camera may receive external multimedia data. Each of the front-facing camera and the rear-facing camera may be a fixed optical lens system or have a focal length and optical zoom capability.

The audio assembly 910 is configured to output and/or input audio signals. For instance, the audio assembly 910 includes a microphone (MIC) configured to receive an external audio signal when the UE 900 is in operational modes, such as a call mode, a recording mode, and a speech recognition mode. The received audio signal may be further stored in the memory 904 or transmitted via the communication assembly 916. In some examples, the audio assembly 910 further includes a speaker for outputting an audio signal.

The I/O interface 912 provides an interface between the processing assembly 902 and a peripheral interface module, such as a keyboard, a click wheel, a button, etc. These buttons may include, but are not limited to, a home button, a volume button, a start button, and a lock button.

The sensor assembly 913 includes at least one sensor for providing state assessments of various aspects of the UE 900. For instance, the sensor assembly 913 may detect an on/off state of the UE 900 and the relative positioning of the assemblies. For instance, the assemblies are a display and a keypad of the UE 900. The sensor assembly 913 may also detect a change in position of the UE 900 or an assembly of the UE 900, the presence or absence of contact between the user and the UE 900, orientation or acceleration/deceleration of the UE 900, and temperature variation of the UE 900. The sensor assembly 913 may include a proximity sensor configured to detect the presence of a nearby object in the absence of any physical contact. The sensor assembly 913 may also include a light sensor, for instance, a complementary metal-oxide-semiconductor (CMOS) or charge-coupled device (CCD) image sensor, for use in imaging applications. In some examples, the sensor assembly 913 may also include an acceleration sensor, a gyroscopic sensor, a magnetic sensor, a pressure sensor, or a temperature sensor.

The communication assembly 916 is configured to facilitate wired or radio communication between the UE 900 and other devices. The UE 900 may access a radio network based on a communication standard, such as WiFi, 2G, or 3G, or a combination of them. In an illustrative example, the communication assembly 916 receives a broadcast signal or broadcast-related information from an external broadcast management system via a broadcast channel. In an illustrative example, the communication assembly 916 also includes a near-field communication (NFC) module to facilitate short-range communication. For instance, the NFC module may be implemented based on a radio frequency identification (RFID) technology, an infrared data association (IrDA) technology, an ultra-wideband (UWB) technology, a Bluetooth (BT) technology, and other technologies.

In an illustrative example, the UE 900 may be implemented by at least one application-specific integrated circuit (ASIC), a digital signal processor (DSP), a digital signal processing device (DSPD), a programmable logic device (PLD), a field programmable gate array (FPGA), a controller, a microcontroller, a microprocessor, or other electronic elements for executing the method above.

Figure 10:
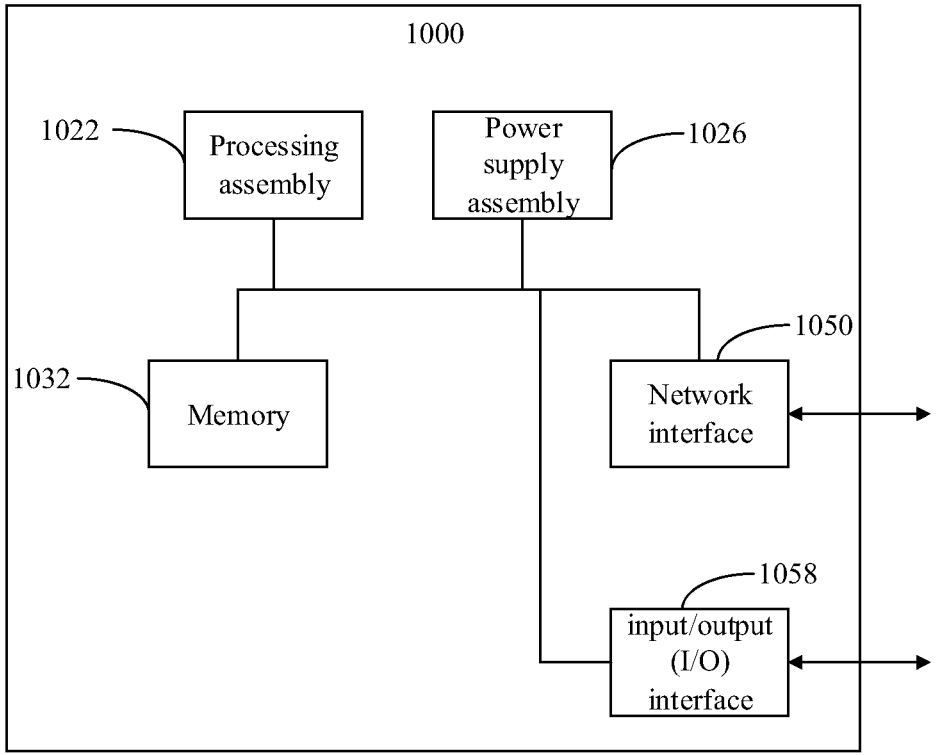
FIG. 10 is a block diagram of a base station according to an example of the disclosure.

FIG. 10 is a block diagram of a base station 1000 provided in an example of the present application. For instance, the base station 1000 may be provided as a base station. With reference to FIG. 10, the base station 1000 includes a processing assembly 1022, and further includes at least one processor, and memory resources represented by a memory 1032 for storing an instruction executable by the processing assembly 1022, for instance, an application program. The application program stored in the memory 1032 may include one or more modules, each of which corresponds to a set of instructions. Moreover, the processing assembly 1010 is configured to execute an instruction, so as to execute any of the methods described above performed by the base station, for instance, the method shown in FIG. 1.

The base station 1000 may further include a power supply assembly 1026 configured to execute power supply management of the base station 1000, a wired or radio network interface 1050 configured to connect the base station 1000 to a network, and an input/output (I/O) interface 1058. The base station 1000 may operate an operating system stored in the memory 1032, for instance, Windows Server™, Mac OS X™, Unix™, Linux™, FreeBSD™, etc.

Those skilled in the art can readily conceive of other embodiments of the disclosure upon consideration of the specification and practice of the disclosure. The disclosure is intended to cover any variations, uses, or adaptive changes of the disclosure, and these variations, uses, or adaptive changes follow general principles of the disclosure and include common general knowledge or customary technical means in the technical field not disclosed in the disclosure. The description and examples are considered as illustrative only, and a true scope and spirit of the disclosure are indicated by the following claims.

It may be understood that the disclosure is not limited to the precise structure that has been described above and shown in the accompanying drawings, and that various modifications and changes may be made without departing from its scope. The scope of the disclosure is limited only by the appended claims.

Additional non-limiting embodiments of the disclosure include:

1. A method for receiving a signal, performed by the user equipment (UE), and including:

receiving an indication message sent from a base station, wherein the indication message includes a paging early indication (PEI), and the PEI is used to indicate an availability state of a reference signal of the UE; and synchronizing the UE using the reference signal according to the availability state of the reference signal.

2. The method according to embodiment 1, where receiving the indication message sent by the base station includes:

receiving the indication message sent by the base station via a sequence, where the sequence is used to indicate the availability state of the reference signal of the UE.

3. The method according to embodiment 2, where the sequence is included in a sequence set, the sequence set includes a first part of sequences and a second part of sequences, the first part of sequences and the second part of sequences each include N groups of sequences, where N is a positive integer, and a group of sequences in the N groups of sequences separately corresponds to one group of UEs;

the N groups of sequences in the first part of sequences are separately used to indicate that reference signals of corresponding UE groups are in an available state; and the N groups of sequences in the second part of sequences are separately used to indicate that reference signals of corresponding UE groups are in an unavailable state.

4. The method according to embodiment 3, where after receiving the indication message sent by the base station via a sequence, the method further includes:

determining whether the sequence is a sequence corresponding to the UE;

determining a part of the sequence set to which the sequence belongs in response to determining that the sequence is a sequence corresponding to the UE;

determining that the reference signal of the UE is in an available state in response to determining that the sequence belongs to the first part of sequences of the sequence set; and alternatively, determining that the reference signal of the UE is in an unavailable state in response to determining that the sequence belongs to the second part of sequences of the sequence set.

5. The method according to embodiment 3, where the first part of sequences includes sequences of a first half of the sequence set, and the second part of sequences includes sequences of a second half of the sequence set.

6. The method according to embodiment 3, where grouping of UEs is determined by the following steps:

obtaining N groups of UEs by grouping UEs corresponding to the physical downlink control channel (PDCCH).

7. The method according to embodiment 1, where receiving the indication message sent by the base station includes:

receiving the indication message sent by the base station via downlink control information (DCI) signaling, where the PEI in the indication message includes an indication identifier, and the indication identifier is used to indicate the availability state of the reference signal of the UE.

8. The method according to embodiment 7, where the PEI further includes a UE identifier; and the indication identifier in the PEI is used to indicate the availability state of the reference signal of the UE indicated by the UE identifier in the PEI.

9. The method according to embodiment 8, where after receiving the indication message sent by the base station via DCI signaling, the method further includes:

judging whether the UE identifier in the PEI is an identifier of the UE; and determining the availability state of the reference signal of the UE according to the indication identifier in response to determining that the UE identifier is the identifier of the UE.

10. The method according to any one of embodiments 1 to 9, where the reference signal includes at least one of a tracking reference signal (TRS), a channel state information-reference signal (CSI-RS), or a secondary synchronization signal (SSS).

11. A method for sending a signal, performed by a base station, and including:

sending an indication message to the UE, where the indication message includes a PEI, and the PEI is used to indicate an availability state of a reference signal of the UE.

12. The method according to embodiment 11, where sending the indication message to the UE includes:

sending the indication message to the UE via a sequence.

13. The method according to embodiment 12, where the sequence is included in a sequence set, the sequence set includes a first part of sequences and a second part of sequences, the first part of sequences and the second part of sequences each include N groups of sequences, where N is a positive integer, and a group of sequences in the N groups of sequences separately corresponds to one group of UEs;

the N groups of sequences in the first part of sequences are separately used to indicate that reference signals of corresponding UE groups are in an available state; and the N groups of sequences in the second part of sequences are separately used to indicate that reference signals of corresponding UE groups are in an unavailable state.

14. The method according to embodiment 13, where sending the indication message to the UE via a sequence includes:

determining a sequence corresponding to the UE in the first part of sequences, and a sequence corresponding to the UE in the second part of sequences;

sending the indication message by using the sequence corresponding to the UE in the first part of sequences when the base station needs to indicate that the reference signal of the UE is in an available state; and alternatively, sending the indication message by using the sequence corresponding to the UE in the second part of sequences when the base station needs to indicate that the reference signal of the UE is in an unavailable state.

15. The method according to embodiment 13, where the first part of sequences includes sequences of a first half of the sequence set, and the second part of sequences includes sequences of a second half of the sequence set.

16. The method according to embodiment 13, where the N groups of UEs are obtained by grouping UEs corresponding to the PDCCH.

17. The method according to embodiment 11, where sending the indication message to the UE includes:

sending the indication message to the UE via DCI signaling, where the PEI in the indication message includes an indication identifier, and the indication identifier is used to indicate the availability state of the reference signal of the UE.

18. The method according to embodiment 17, where the PEI further includes a UE identifier; and the indication identifier in the PEI is used to indicate the availability state of the reference signal of the UE indicated by the UE identifier in the PEI.

19. The method according to any one of the embodiments 11 to 18, where the reference signal includes at least one of a TRS, a CSI-RS, or an SSS.

20. An apparatus for receiving a signal, including:

a reception module configured to receive an indication message sent from a base station, where the indication message includes a PEI, and the PEI is used to indicate an availability state of a reference signal of the UE; and a synchronization module configured to synchronize the UE using the reference signal according to the availability state of the reference signal.

21. The apparatus according to embodiment 20, where the reception module is further configured to:

receive the indication message sent by the base station via a sequence, where the sequence is used to indicate the availability state of the reference signal of the UE.

22. The apparatus according to embodiment 21, where the sequence is included in a sequence set, the sequence set includes a first part of sequences and a second part of sequences, the first part of sequences and the second part of sequences each include N groups of sequences, where N is a positive integer, and a group of sequences in the N groups of sequences separately corresponds to one group of UEs;

the N groups of sequences in the first part of sequences are separately used to indicate that reference signals of corresponding UE groups are in an available state; and the N groups of sequences in the second part of sequences are separately used to indicate that reference signals of corresponding UE groups are in an unavailable state.

23. The apparatus according to embodiment 22, further including:

a determination module configured to determine whether the sequence is a sequence corresponding to the UE; and a processing module configured to determine a part of the sequence set to which the sequence belongs in response to determining that the sequence is a sequence corresponding to the UE; determine that the reference signal of the UE is in an available state in response to determining that the sequence belongs to the first part of sequences of the sequence set; and alternatively, determine that the reference signal of the UE is in an unavailable state in response to determining that the sequence belongs to the second part of sequences of the sequence set.

24. The apparatus according to embodiment 20, where the reception module is further configured to:

receive the indication message sent by the base station via DCI signaling, where the PEI in the indication message includes an indication identifier, and the indication identifier is used to indicate the availability state of the reference signal of the UE.

25. The apparatus according to embodiment 24, where the PEI further includes a UE identifier; and the indication identifier in the PEI is used to indicate the availability state of the reference signal of the UE indicated by the UE identifier in the PEI.

26. The apparatus according to embodiment 25, further including:

a judgment module configured to judge whether the UE identifier in the PEI is an identifier of the UE; and a determination module configured to determine the availability state of the reference signal of the UE according to the indication identifier in response to determining that the UE identifier is the identifier of the UE.

27. An apparatus for sending a signal, including:

a sending module configured to send an indication message to the UE, where the indication message includes a PEI, and the PEI is used to indicate an availability state of a reference signal of the UE.

28. The apparatus according to embodiment 27, where the sending module is configured to:

send the indication message to the UE via a sequence.

29. The apparatus according to embodiment 27, where the sequence is included in a sequence set, the sequence set includes a first part of sequences and a second part of sequences, the first part of sequences and the second part of sequences each include N groups of sequences, where N is a positive integer, and a group of sequences in the N groups of sequences separately corresponds to one group of UEs;

the N groups of sequences in the first part of sequences are separately used to indicate that reference signals of corresponding UE groups are in an available state; and the N groups of sequences in the second part of sequences are separately used to indicate that reference signals of corresponding UE groups are in an unavailable state.

30. The apparatus according to embodiment 29, where the sending module is further configured to:

determine a sequence corresponding to the UE in the first part of sequences, and a sequence corresponding to the UE in the second part of sequences;

send the indication message by using the sequence corresponding to the UE in the first part of sequences when the base station needs to indicate that the reference signal of the UE is in an available state; and alternatively, send the indication message by using the sequence corresponding to the UE in the second part of sequences when the base station needs to indicate that the reference signal of the UE is in an unavailable state.

31. The apparatus according to embodiment 27, where the sending module is further configured to:

send the indication message to the UE via DCI signaling, where the PEI in the indication message includes an indication identifier, and the indication identifier is used to indicate the availability state of the reference signal of the UE.

32. The apparatus according to embodiment 31, where the PEI further includes a UE identifier; and the indication identifier in the PEI is used to indicate the availability state of the reference signal of the UE indicated by the UE identifier in the PEI.

33. User equipment, including a transceiver, a memory, and a processor that is connected to the transceiver and the memory separately, is configured to control radio signal transceiving by the transceiver by executing a computer-executable instruction in the memory, and implements the method according to any one of the embodiments 1 to 10.

34. A base station, including a transceiver, a memory, and a processor that is connected to the transceiver and the memory separately, is configured to control radio signal transceiving by the transceiver by executing a computer-executable instruction in the memory, and implements the method according to any one of the embodiments 11 to 19.

35. A non-transitory computer-readable storage medium, storing a computer-executable instruction, where the computer-executable instruction implements the method according to any one of embodiments 1 to 10 or 11 to 19 after being executed by a processor.

What is claimed is:

1. A method for receiving a signal, performed by a user equipment (UE), and comprising:

receiving an indication message sent by a base station, wherein the indication message comprises a paging early indication (PEI), and the PEI indicates an availability state of a reference signal of the UE; and synchronizing the UE using the reference signal according to the availability state of the reference signal;

wherein receiving the indication message sent by the base station comprises:

receiving the indication message sent by the base station via a sequence, wherein the sequence is used to indicate the availability state of the reference signal of the UE;

the sequence is comprised in a sequence set, the sequence set comprises a first part of sequences and a second part of sequences, and the first part of sequences and the second part of sequences each comprise N groups of sequences, wherein N is a positive integer, and a group of sequences in the N groups of sequences separately corresponds to one group of UEs; and the N groups of sequences in the first part of sequences separately indicate that reference signals of corresponding UE groups are in an available state, and the N groups of sequences in the second part of sequences separately indicate that reference signals of corresponding UE groups are in an unavailable state.

2. The method according to claim 1, wherein after receiving the indication message sent by the base station via the sequence, the method further comprises:

determining whether the sequence is a sequence corresponding to the UE;

determining a part of the sequence set to which the sequence belongs in response to determining that the sequence is the sequence corresponding to the UE;

determining that the reference signal of the UE is in the available state in response to determining that the sequence belongs to the first part of sequences of the sequence set; and alternatively, determining that the reference signal of the UE is in the unavailable state in response to determining that the sequence belongs to the second part of sequences of the sequence set.

3. The method according to claim 1, wherein the first part of sequences comprises sequences of a first half of the sequence set, and the second part of sequences comprises sequences of a second half of the sequence set.

4. The method according to claim 1, wherein the grouping of UEs is determined by:

obtaining N groups of UEs by grouping the UEs corresponding to a physical downlink control channels (PDCCH).

5. The method according to claim 1, wherein receiving the indication message sent by the base station comprises:

receiving the indication message sent by the base station via downlink control information (DCI) signaling, wherein the PEI in the indication message comprises an indication identifier, and the indication identifier is used to indicate the availability state of the reference signal of the UE.

6. The method according to claim 5, wherein the PEI further comprises a UE identifier; and the indication identifier in the PEI is used to indicate the availability state of the reference signal of the UE indicated by the UE identifier in the PEI.

7. The method according to claim 6, wherein after receiving the indication message sent by the base station via the DCI signaling, the method further comprises:

judging whether the UE identifier in the PEI is an identifier of the UE; and determining the availability state of the reference signal of the UE according to the indication identifier in response to determining that the UE identifier is the identifier of the UE.

8. The method according to claim 1, wherein the reference signal comprises at least one of:

a tracking reference signal (TRS);

a channel state information-reference signal (CSI-RS); or a secondary synchronization signal (SSS).

9. A non-transitory computer-readable storage medium storing computer-executable instructions, wherein the computer-executable instructions, when executed by a processor, cause the processor to perform the method according to claim 1.

10. A method for sending a signal, performed by a base station, and comprising:

sending an indication message to a user equipment (UE), wherein the indication message comprises a PEI, and the PEI is used to indicate an availability state of a reference signal of the UE;

wherein sending the indication message to the UE comprises:

sending the indication message to the UE via a sequence;

wherein the sequence is comprised in a sequence set, the sequence set comprises a first part of sequences and a second part of sequences, the first part of sequences and the second part of sequences each comprise N groups of sequences, wherein N is a positive integer, and a group of sequences in the N groups of sequences separately corresponds to one group of UEs; and the N groups of sequences in the first part of sequences separately indicate that reference signals of corresponding UE groups are in the available state, and the N groups of sequences in the second part of sequences separately indicate that reference signals of corresponding UE groups are in an unavailable state.

11. The method according to claim 10, wherein sending the indication message to the UE via the sequence comprises:

determining a sequence corresponding to the UE in the first part of sequences, and a sequence corresponding to the UE in the second part of sequences;

sending the indication message by using the sequence corresponding to the UE in the first part of sequences in a case where the base station needs to indicate that the reference signal of the UE is in the available state; and alternatively, sending the indication message by using the sequence corresponding to the UE in the second part of sequences in a case where the base station needs to indicate that the reference signal of the UE is in the unavailable state.

12. The method according to claim 10, wherein the first part of sequences comprises sequences of a first half of the sequence set, and the second part of sequences comprises sequences of a second half of the sequence set.

13. The method according to claim 10, wherein sending the indication message to the UE comprises:

sending the indication message to the UE via downlink control information (DCI) signaling, wherein the PEI in the indication message comprises an indication identifier, and the indication identifier is used to indicate the availability state of the reference signal of the UE.

14. A base station, comprising:

a transceiver;

a memory; and a processor that is connected to the transceiver and the memory separately;

wherein the processor is configured to control radio signal transceiving by the transceiver by executing a computer-executable instruction in the memory, and implements the method according to claim 10.

15. A non-transitory computer-readable storage medium storing computer-executable instructions, wherein the computer-executable instructions, when executed by a processor, cause the processor to perform the method according to claim 10.

16. A user equipment (UE), comprising:

a transceiver;

a memory; and a processor that is connected to the transceiver and the memory separately;

wherein the processor is used to control radio signal transceiving by the transceiver by executing a computer-executable instruction in the memory, and implements:

receiving an indication message sent by a base station, wherein the indication message comprises a paging early indication (PEI), and the PEI is used to indicate an availability state of a reference signal of the UE; and synchronizing the UE using the reference signal according to the availability state of the reference signal;

wherein the processor further implements:

receiving the indication message sent by the base station via a sequence, wherein the sequence is used to indicate the availability state of the reference signal of the UE;

the sequence is comprised in a sequence set, the sequence set comprises a first part of sequences and a second part of sequences, and the first part of sequences and the second part of sequences each comprise N groups of sequences, wherein N is a positive integer, and a group of sequences in the N groups of sequences separately corresponds to one group of UEs; and the N groups of sequences in the first part of sequences separately indicate that reference signals of corresponding UE groups are in an available state, and the N groups of sequences in the second part of sequences separately indicate that reference signals of corresponding UE groups are in an unavailable state.

* * * * *